United States Patent [19]

Rosenberry, Jr.

[11] 4,392,073
[45] Jul. 5, 1983

[54] DYNAMOELECTRIC MACHINE STATOR HAVING CONCENTRIC AMORPHOUS METAL LAMINATIONS AND METHOD OF MAKING SAME

[75] Inventor: George M. Rosenberry, Jr., Hendersonville, Tenn.

[73] Assignee: General Electric Company, Fort Wayne, Ind.

[21] Appl. No.: 942,852

[22] Filed: Sep. 15, 1978

[51] Int. Cl.³ .............................................. H02K 1/00
[52] U.S. Cl. .................................. 310/216; 310/217; 310/259
[58] Field of Search ................. 310/42, 254, 258, 259, 310/216–218, 193

[56] References Cited

U.S. PATENT DOCUMENTS

| | | | |
|---|---|---|---|
| 1,920,354 | 8/1933 | Carpenter | 310/216 X |
| 2,711,008 | 6/1955 | Smith | 310/216 X |
| 3,188,505 | 6/1965 | Wiley | 310/259 |
| 3,320,451 | 5/1967 | Wiley | 310/216 X |
| 3,562,568 | 2/1971 | Susdorf et al. | 310/216 X |

OTHER PUBLICATIONS

Luborsky et al., "Potential of Amorphous Alloys for Application in Magnetic Devices", J. Appl. Phys., 3/78, pp. 1769-1774.

*Primary Examiner*—Donovan F. Duggan
*Attorney, Agent, or Firm*—Vale P. Myles

[57] ABSTRACT

A dynamoelectric machine stator formed of first and second concentrically mounted cylinders at least one of which is made of coiled amorphous metal ribbon. One of the cylindrical portions of the stator is formed of an edgewound helical ribbon in which the respective turns are dished into a conical shape to provide either a uniform outer diameter for the cylinder within a close range of tolerances that affords a low reluctance joint between the cylinders when they are concentrically mounted, or an accurate alignment of winding-receiving slots in adjacent turns of the dished ribbon. According to one aspect of the invention, a method for manufacturing a helically wound, amorphous metal stator is provided.

11 Claims, 8 Drawing Figures

DYNAMOELECTRIC MACHINE STATOR HAVING CONCENTRIC AMORPHOUS METAL LAMINATIONS AND METHOD OF MAKING SAME

BACKGROUND OF THE INVENTION

The invention relates to dynamoelectric machines that incorporate amorphous metals in the core structure thereof, and more particularly relates to an amorphous metal stator structure including concentric cylinders formed of spirally or helically wound ribbon that is arranged to facilitate the mounting of one of the stator cylindrical components within the other. A method of manufacturing a dynamoelectric machine stator formed of concentric cylinders of amorphous metal is an aspect of the invention.

As the term amorphous metal is used herein it is meant to describe metals and metal alloys as well as metallic glass compositions that are formed by rapidly cooling from a molten state to a solid state so that there is no significant crystalline structure existing in the solidified state. In general, a cooling rate in the order of one million degrees Centigrade per second has been found suitable for manufacturing amorphous metal or metallic glass ribbon having a thickness of about 2 mils. More generally, depending upon the composition of a given amorphous metal, a suitable cooling rate may be in the range of $10^5$ C. to $10^8$ C. per second.

In the last several years a variety of methods have been developed for successfully forming amorphous metal ribbons of sufficient width and length to enable their use in making a variety of electromagnetic devices. In the early stages of development of such methods, the critical cooling rates needed to successfully form reasonably long strands of amorphous metal limited their application to the manufacture of very thin filaments. Examples of such prior art methods used to form filaments of amorphous metal are shown in U.S. Pat. Nos. 2,825,108 and 2,879,566 which issued, respectively, on Mar. 4, 1958 and Mar. 31, 1959. As explained in those patents, the methods disclosed involve feeding a thin stream of molten alloy onto either a chilled block or into a jetstream of chilled air in order to attain the necessarily rapid solidification of the alloy that prevents it from entering a crystalline state. Subsequently, other techniques were developed for applying continuous streams of molten amorphous metal to rapidly rotating chilled discs or cylinders to form substantially wider ribbons. At the present time, ribbons of amorphous metal up to two inches in width have been successfully formed in commercially useful lengths.

A summary of relatively recent technology relating to methods for making amorphous metal ribbons is presented in an article by Mr. J. J. Gilman, entitled "Metallic Glasses" which was published in the May 1975 issued of Physics Today, at pages 46 through 53. More recently, additional processes have been developed for manufacturing amorphous metal ribbons, having widths in the range of one-half to two inches, which are more adaptable for use in products that have relatively massive metallic body portions. Examples of some of those more recent processes and resulting ribbons are disclosed in U.S. Pat. Nos. 3,856,513, which issued on Dec. 24, 1974; 3,881,542, which issued on May 6, 1975; 4,059,441, which issued on Nov. 22, 1977 and 4,067,732 which issued on Jan. 10, 1978.

In addition to the evolution of manufacturing processes for making amorphous metal ribbons of widths that are useful in the manufacture of electromagnetic devices, it is explained in the above-noted article and in more recent publications such as an article by Mr. A. N. Martin entitled, "Metallic Glasses for the Electrical and Electronic Industries" which appeared in the January 1976, Vol. 37, issue of Engineer's Digest at pages 21 and 22, that considerable work has been done in developing amorphous metals having other desired characteristic properties such as improved ductility, thermal stability, and high magnetic induction. U.S. Pat. No. 4,036,638, which issued on July 19, 1977, discloses a number of binary amorphous alloys of iron or cobalt and boron that are characterized by having high mechanical hardness and soft magnetic properties while being free from embrittlement when heat treated in annealing processes. Annealing has been found to be a desirable way to stabilize the structure of amorphous metal ribbon used to form dynamoelectric machine stators. Another recently published article describing the current state of the art in amorphous metals useful in making products such as dynamoelectric machine stators is contained in Applied Physics, 49 (3), Part II, March 1978 at pages 1769 through 1774, authored by F. E. Luborsky, et al and entitled, "Potential of Amorphous Metals for Application in Magnetic Devices."

The properties of amorphous metal ribbons that make them particularly attractive for use in the manufacture of dynamoelectric machine stators is that such ribbons are mechanically strong and ductile and can be manufactured at relatively low cost compared with grain-oriented silicon steels of the types now commonly used to make such stators. It has been found that amorphous metal ribbon having suitably high magnetic induction can be formed of a composition such as $Fe_{80}B_{20}$ which has one-fourth the magnetic losses of grain-oriented silicon steel, at a given induction for sinusoidally applied flux.

In addition to the information relating to amorphous metals given in the above-identified publications, several associates of the inventor named in this application have co-pending U.S. patent applications, which are also assigned to General Electric Company, and which disclose recent methods and compositions of materials for making amorphous metal ribbon that are particularly suited for use in the manufacture of dynamoelectric machine stators. Some of those patent applications also describe various stator and rotor structures formed of amorphous metal materials. For the convenient reference of the reader and to provide further background for the subject invention, several of those patent applications are identified below:

U.S. patent application Ser. No. 914,190, filed on June 12, 1978, (now abandoned) in the name of Thomas E. Lipo, entitled "Salient Pole Configuration for Use as a Reluctance Motor Employing Amorphous Metal"

U.S. patent application Ser. No. 914,194, filed on June 12, 1978, (now abandoned in favor of continuation application Ser. No. 208,427, filed Nov. 19, 1980) in the names of Vernon B. Honsinger and Russell E. Tompkins, entitled "Slotless Motor Design Using Amorphous Metal"

U.S. patent application Ser. No. 914,445, filed June 12, 1978, which issued on Aug. 25, 1981 as U.S. Pat. No. 4,286,188, in the names of Vernon B.

Honsinger and Russell E. Tompkins, entitled "Amorphous Metal Hysteresis Motor"

U.S. patent application Ser. No. 914,446, filed on June 12, 1978 (now abandoned) in the names of Vernon B. Honsinger and Russell E. Tompkins, entitled "Stator Design for Induction & Hysteresis Motors Using Amorphous Metal Tapes"

Although amorphous metal ribbons are commercially available having the desirable characteristics mentioned above, such ribbons also have inherent limitations that restrict their application in the manufacture of products such as dynamoelectric machine stators. One of the most significant limitations is that the relatively narrow widths of such available ribbons makes it necessary to form stator structures that incorporate a plurality of concentrically mounted edgewound ribbons in order to build enough metal into the structures to yield desired electrodynamic and thermal capabilities. In order to minimize the magnetic reluctance and mechanical movement between such concentrically mounted cylinders, it is necessary to form a close tolerance fit between the abutting surfaces of the cylinders. Normally expensive precision machining operations are required to achieve such close tolerance fits; thus, it would be desirable to have available alternative means for achieving the same or better results at lower cost.

Another problem associated with the use of amorphous metal ribbon to form stator structures results from a need to provide winding receiving slots in the thin ductile ribbons so that an energizing winding can be mounted on the stator. Because of the thinness of these ribbons, which as noted above typically is in the range of one-half to two mils, it has been found that conventional stator lamination punching techniques are not readily suited to forming the winding receiving slots. Consequently, processes have been developed for forming slots in amorphous metal ribbons at the time they are cast; as explained, for example, in the above-mentioned patent application Ser. No. 903,140 which issued on May 22, 1979 as U.S. Pat. No. 4,155,397. When such slotted ribbons are edgewound in a helical form and stacked into cylinders to make a dynamoelectric machine stator, it is necessary to accurately align the slots to form axially-extending, winding-receiving slots while at the same time maintaining the outer diameter of the cylinder within a given tolerance so that it will cooperate in low magnetic reluctance relationship with a concentrically mounted cylindrical metal yoke. To achieve those objectives, it is usually necessary to either employ precision casting techniques that are expensive to perform, or to perform costly machining operations on the stator after the ribbon is wound into cylindrical form.

Accordingly, a primary object of the present invention is to provide a dynamoelectric machine stator formed of amorphous metal that overcomes the above-noted disadvantages of related prior art amorphous metal machines.

Another object of the invention is to provide a dynamoelectric machine stator having a plurality of different diameter, edgewound helical ribbons arranged to form, respectively, laminated cylinders of different diameters that are mounted concentrically within one another with a low magnetic reluctance junction between them.

Yet another object of the invention is to provide a dynamoelectric machine stator formed of an edgewound helical amorphous metal ribbon arranged in a cylinder with the individual turns thereof in frusto-conical shape, in combination with a second cylinder formed of amorphous metal ribbon disposed in low magnetic reluctance relationship around the exterior of the first cylinder.

Still another object of the invention is to provide a dynamoelectric machine stator formed of helically wound, conically shaped coils of amorphous metal ribbon containing accurately aligned winding-receiving slots in the inner surface thereof.

A further object of the invention is to provide a method for manufacturing a dynamoelectric machine stator of a plurality of cylinders formed respectively of helically wound ribbons of amorphous metal, one of which is provided with conical turns to accurately adjust the diameter of its turns and to precisely align winding slots therein.

Additional objects and advantages of the invention will be apparent to those skilled in the art from the description of it that follows considered in conjunction with the accompanying drawings.

BRIEF SUMMARY OF THE INVENTION

In one preferred embodiment of the invention a dynamoelectric machine stator is formed of two cylinders each of which are made of amorphous metal ribbon. The cylinders are concentrically mounted within one another in low magnetic reluctance relationship. One of the cylinders comprises an edgewound helical arrangement of amorphous metal ribbon stacked and bonded in cylindrical configuration, with the respective turns of the helix substantially perpendicular to the longitudinal axis of the cylinder. The other cylinder comprises an edgewound helix of amorphous metal ribbon with the respective turns thereof stacked and bonded together in cylindrical configuration so that the individual turns thereof are held in conical shape. The conical shape of the turns in the second cylinder is formed by dishing the turns to provide a close tolerance fit between the two cylinders when they are mounted concentrically to form the desired stator core, and/or to align winding slots in adjacent turns of the cylinder. In addition to the novel structure, the invention includes a method for making a dynamoelectric machine stator of a plurality of concentrically disposed, edgewound amorphous metal ribbons.

DESCRIPTION OF THE PREFERRED EMBODIMENTS

Before describing the detailed features of the preferred embodiments of the invention, it should be understood that conventional practices may be followed to construct suitable typical dynamoelectric machine components, for use in combination with the unique stator structure of the invention, in order to complete an operable electric motor or generator. For example, conventional winding means of various types may be used to energize the stators described below, and a wide selection of different rotor structures and associated housings, bearings, insulation systems, and so on may be employed with the disclosed stators of the invention. Those skilled in the art have ready access to numerous sources of information regarding such conventional dynamoelectric machine structures but, as a particular example of such known structures, the reader may desire to make reference to U.S. Pat. No. 3,188,505, which issued on June 8, 1965 and describes a prior art type of dynamoelectric machine that is formed by edgewinding a helix of slotted metal tape to form stator and rotor components of a dynamoelectric machine. The slotted tape disclosed in that patent is a relatively thick crystalline metal alloy that can be punched to form winding slots in it, rather than being a thin (2 mil thick) amorphous metal ribbon.

Figure 1:
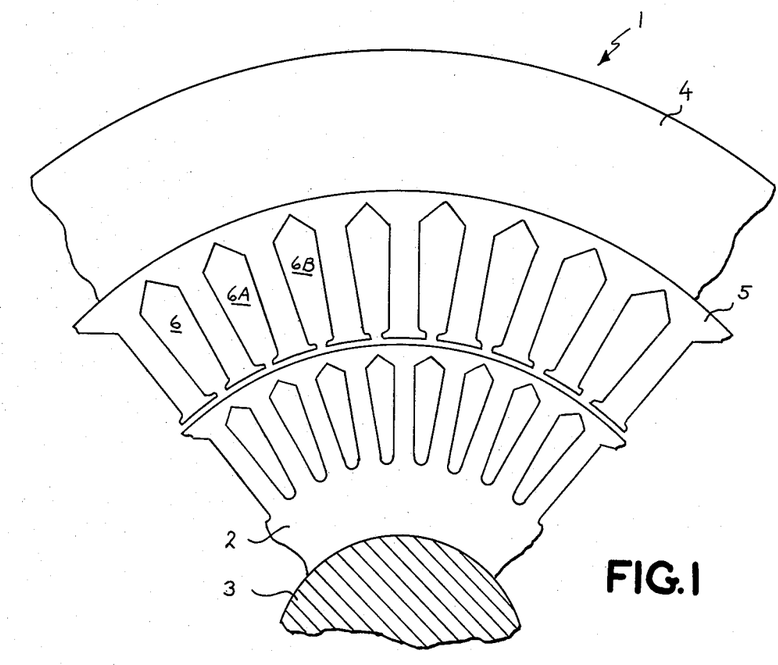
FIG. 1 is a side elevation of a fragment of a dynamoelectric machine stator constructed pursuant to the invention and shown with respect to a rotatably mounted portion of a rotor suitable for conventional use with the stator.

Now, referring to FIGS. 1 and 2 of the drawing, a preferred embodiment of a stator assembly 1 constructed according to the invention will be described. In FIG. 1 the portion of stator assembly 1 shown is spaced radially outward from a rotor 2 that is mounted on a rotatable shaft 3 in any suitable conventional manner, such as by being keyed thereto. If desired, the stator assembly 1 may be housed in a conventional ferrous metal housing (not shown) or in any other conventional manner.

The stator 1 comprises a first cylinder 4 that is mounted in low magnetic reluctance relationship concentrically with a second cylinder 5. The desired optimumly low reluctance relationship is attained between the two cylinders 4 and 5 by causing the inner diameter of the cylinder 4 to fit within a close dimension tolerance with the outer diameter of the second cylinder 5. Such a low tolerance fit is readily obtainable with the unique stator structure of the present invention, as will become clear from the description that follows. In the embodiment of the invention illustrated in FIGS. 1 and 2, the first cylinder 4 is formed of an edgewound helix of amorphous metal ribbon that is arranged with its adjacent turns stacked on one another to form the cylinder. The resultant laminated arrangement of the wall of the first cylinder 4 is shown clearly in the cross-sectioned portion of FIG. 2.

It has been found that a layer of insulating material is not needed between adjacent turns of the helix comprising the first cylinder 4, if the cylinder is annealed to form an oxide layer on it. However, in embodiments for some applications it has been found desirable to coat the wide surfaces of the helical turns of the cylinder 4 with a suitable bonding and insulating resin in order to achieve optimum reduction of eddy currents in the stator. A suitable commercially available resin for this purpose is any of the resins now commonly used to insulate the laminations of conventional electric motor stators and rotors by well-known vacuum pressure impregnation processes.

Figure 2:
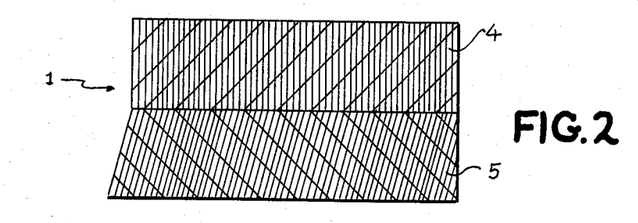
FIG. 2 is a fragmentary side elevation view, in cross-section, of a dynamoelectric machine stator similar to that shown in FIG. 1.

As shown in FIG. 2, the respective helical turns forming the first cylinder 4 lie in planes that are substantially perpendicular to the longitudinal axis of the cylinder. On the other hand, each of the turns of a second helically wound cylinder 5 of amorphous metal ribbon is conical in configuration, as best seen in FIG. 2 of the drawing. This conical arrangement is an important feature of the present invention because it enables the maximum diameter of the second cylinder 5 to be precisely adjusted to fit snugly within the inner diameter of the first cylinder 4 thereby to dispose the inner edges of the turns of the first helix 4 in abutting relationship, respectively, with adjacent outer edges of the turns of the second helix 5. Such close abutment is necessary to enable a low magnetic reluctance joint to be formed and maintained between the two cylinders. The dished or conical configuration of the turns of the helix forming the second cylinder 5 may be attained in various ways, as will be explained more fully below after the description of the stator 1 is completed.

To enable energizing windings to be supported in operating relationship on the stator 1, the second cylinder 5 is provided with a plurality of axially extending winding slots 6, 6A, 6B, etc. which may be formed therein in any suitable manner. For example, the slots may be cast directly into the amorphous metal ribbon forming the cylinder 5 at the time the ribbon is originally solidified, as explained in co-pending U.S. application Ser. No. 903,140. A coating of bonding and insulating resin, which may be similar to the resin identified above with reference to the first cylinder 4, is applied in substantially uniform thickness over the wide surfaces of essentially all of the turns of the second cylinder 5. As indicated above, due to the nature of existing manufacturing processes for making ribbons of amorphous metal, the thicknesses of the ribbons in the first and second helical cylinders 4 and 5 will be in the range of about 1 to 3 mils and is about 2 mils in the preferred embodiment of the invention. It will be noted that if the helical turns of the second cylinder 5 are solidified into a conical configuration in their unsupported condition, such that the turns have an outside diameter slightly larger than the inside diameter of the first cylinder 4, the second cylinder 5 can be forced into the first cylinder so the turns of the second helix 5 will be further dished and then supported in radial compression by the turns of the first cylinder 4. Such dishing and radial compression assures a low reluctance junction between the two cylinders. At the same time, it obviates the need to precision machine or otherwise form abutting surfaces of either cylinder to assure a close tolerance fit. Another method of forming such a two-part stator is to form a first cylinder of helically wound amorphous metal ribbon, then wind the second cylinder around the first cylinder, pulling the ribbon of the second cylinder tight to hold its turns in a desired conical form until the assembly is fixed in position by being potted in an insulating and bonding resin.

Figure 3:
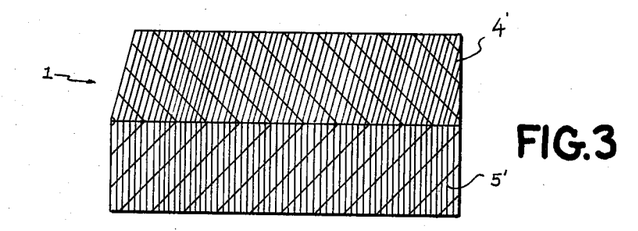
FIG. 3 is a fragmentary side elevation view, in cross-section, of an alternative form of dynamoelectric machine stator similar to the stator shown in FIG. 1.
Figure 4:
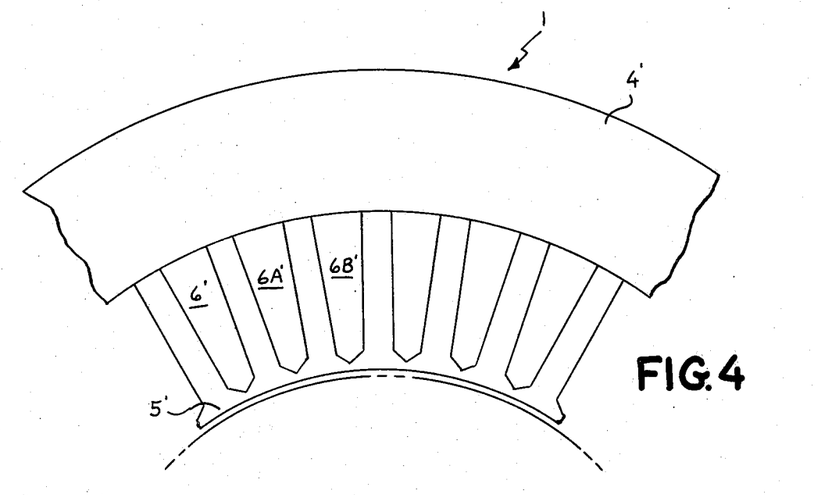
FIG. 4 is a side elevation of a portion of one end of an alternative form of dynamoelectric machine stator constructed according to the invention and having winding-receiving slots that open to the outer periphery of an inner cylindrical portion of the stator.

An alternative embodiment of a stator formed according to the invention is shown in FIGS. 3 and 4 of the drawing, where like reference numbers are used to designate similar parts. Thus, a portion of a stator 1 is shown having a first, outer cylinder 4' and a second, inner cylinder 5'. The outer cylinder 4' is formed by edgewinding a helical strip of amorphous metal ribbon in the manner described above with reference to the embodiment of the invention shown in FIG. 1. Similarly, the second cylinder 5' is formed by edge-winding a second helical strip of amorphous metal ribbon. However, it will be noted (see FIG. 4) that the strip of ribbon used to form the helical turns of the second cylinder 5' is provided with winding-receiving slots disposed in its outer peripheral surface. Thus, in the manufacture of a stator assembly 1 in accordance with this embodiment of the invention a suitable energizing winding will preferably be mounted in the slot 6', 6A', 6B', etc. before the second cylinder 5' is inserted within the first cylinder 4'. The respective turns of the second cylinder 5' may be conical in configuration such as those shown in FIG. 2 with respect to the cylinder 5 of the first embodiment of the invention. However, in order to explain yet another alternative form of the present invention, the relationship of the helical turns in the first cylinder 4' and the second cylinder 5' of this embodiment, as shown in FIGS. 3 and 4, is such that the turns of cylinder 4' are disposed in conical arrangement as seen in cross-section in FIG. 3 of the drawing. Thus, the respective turns of the second cylinder 5' are, in fact, generally perpendicular to the longitudinal axis of that cylinder whereas, the respective turns of the first cylinder 4' are disposed in generally conical relationship around the longitudinal axis of that cylinder. To the extent that it is necessary for the diameter of the first cylinder 4' to be adjusted to accommodate the second cylinder 5' in low reluctance relationship, an adjustment of the diameter can be made by tightening or loosening the turns of the first cylinder 4', thereby forming a deeper or shallower dished configuration in the respective turns before they are bonded together with a suitable resin, as described above.

From the foregoing description it will be apparent that in practicing the invention to manufacture a stator 1, a plurality of spaced axial winding slots can be formed in either the inner surface of the second cylinder 5, as illustrated in FIG. 1, for receiving therein the turns of a stator winding, or a plurality of such axial slots can be formed in the outer surface of the second cylinder 5' as shown by the slots 6', 6A', 6B', etc. in FIG. 4 of the drawing.

In order to avoid the need to fold or overlap the inner edges of the respective turns of either the first cylinder 4 or second cylinder 5 (as shown in FIGS. 1 and 2), the amorphous metal ribbons forming these cylinders are cast in helical patterns having given selected diameters in their unsupported conditions. Such a casting operation is performed, as is explained more fully below with reference to FIG. 6 of the drawing, by applying a continuous stream of molten metal alloy to a rapidly revolving chilled disc so that the metal is solidified in a diameter substantially equal to that of the portion of the disc contacted by the metal as it is cast. Although reasonably precise tolerances can be maintained in thus forming a ribbon to a pre-selected diameter in its unsupported condition, it will be appreciated that a very close tolerance is needed to attain the desired low reluctance junction between the concentrically mounted cylinders (either 4 and 5, or 4' and 5') in the stator assemblies (1) described above.

Figure 5:
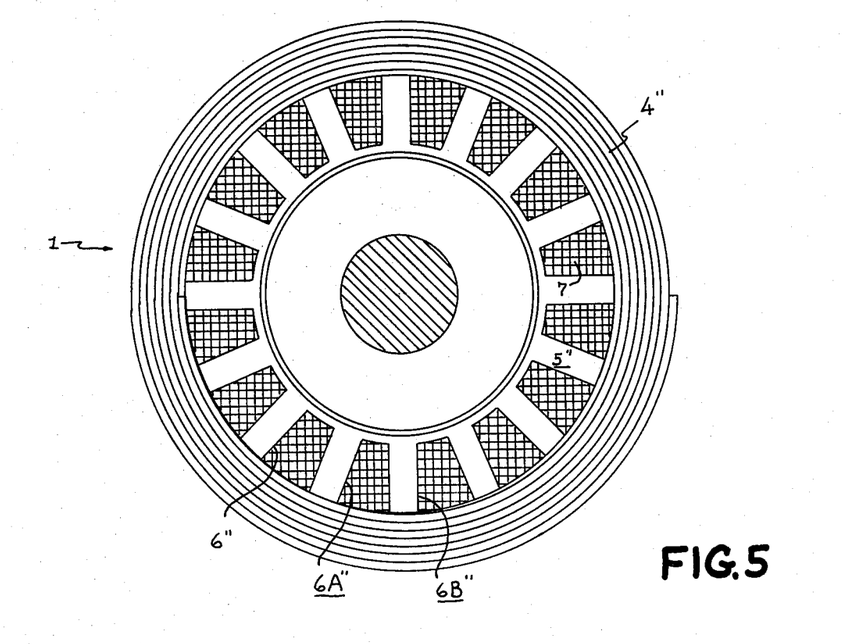
FIG. 5 is an end elevation of a dynamoelectric machine stator formed, according to the invention, of a toroidally wound cylinder mounted around an edgewound helical cylinder having winding-receiving slots disposed in the outer peripheral surface thereof, and illustrated with respect to a rotor suitable for operation therewith.

Now that the basic features of the invention are understood, reference will be made to FIG. 5 where there is shown yet another alternative embodiment of a stator assembly 1 constructed according to the invention. In this form of the invention the stator assembly 1 comprises a first strip of amorphous metal ribbon that is spirally wound to define a first cylinder 4". A second helical strip of edgewound amorphous metal ribbon is arranged to define a second cylinder 5" that has its respective helical turns centered in conical relationship around its longitudinal axis. Otherwise, the structure is substantially similar to the stator structure described above with reference to FIGS. 1-4, in that the second cylinder 5" is mounted within the first cylinder 4" after a suitable energizing winding 7 is mounted in respective winding slots 6", 6A", 6B", et cetera. In this form of the invention after the inner diameter of the first cylinder 4" is established by spirally winding the cylinder on a drum or mandrel of pre-selected size, the edgewound helical turns of the second cylinder 5" are adjusted to precisely match the inner diameter of the first cylinder and form the desired low reluctance magnetic junction. At the same time, the winding slots 6", 6A", 6B", etc. in the respective turns of the second cylinder 5" are accurately aligned by appropriately dishing the turns into a conical shape, as explained above. As mentioned above, in other embodiments, the turns of the first cylinder 4" may be wound around the second cylinder 5" after it is formed and its turns are fixed in position by being bonded together.

From the description presented thus far, it should be appreciated that the multi-cylinder composite stator structure of the invention affords unique advantages in the construction of a dynamoelectric machine. For example, considering the embodiment of the invention shown in FIGS. 1 and 2, it will be recognized that the amorphous metal alloys used to form the helical turns of the second cylinder 5 can be selected to have a substantially higher magnetic induction than that of the amorphous metal alloy used to form the respective helical turns of the first cylinder 4. In fact, in a further extension of this principle of flexibility in the make-up of stator 1, in a given embodiment, one of the cylinders in the assembly can be formed of high induction amorphous metal alloy while the other cylinder is formed of a high induction crystalline metal alloy, such as a currently available grain oriented silicon steel tape. In such an embodiment, the ferrous steel tape would best be wound in spiral form, as shown in FIG. 5 of the drawing, to avoid the formation of inner-diameter flutes or folds, similar to those illustrated in the edgewound helical stator configuration described in the above-mentioned U.S. Pat. No. 3,188,505. Also, it would be desirable to either use doubly oriented steel or to use a strip of singly oriented steel so that the teeth are in alignment with all, or at least half, of the oriented grains in the steel strip.

An important advantage of the present invention is that the respective wide surfaces of the turns of both the first and second helixes 4 and 5, or their counterparts illustrated in the other Figures of the drawing, are always maintained substantially smooth and flat. This desirable relationship is afforded by the nature of amorphous metal ribbon and by the structural arrangements described above. Thus, the overall dimensions of a stator made according to the invention are relatively small compared with prior art devices, such as the folded and fluted helical turns of an edgewound stator lamination made according to the teachings of U.S. Pat. No. 3,188,505.

Figure 6:
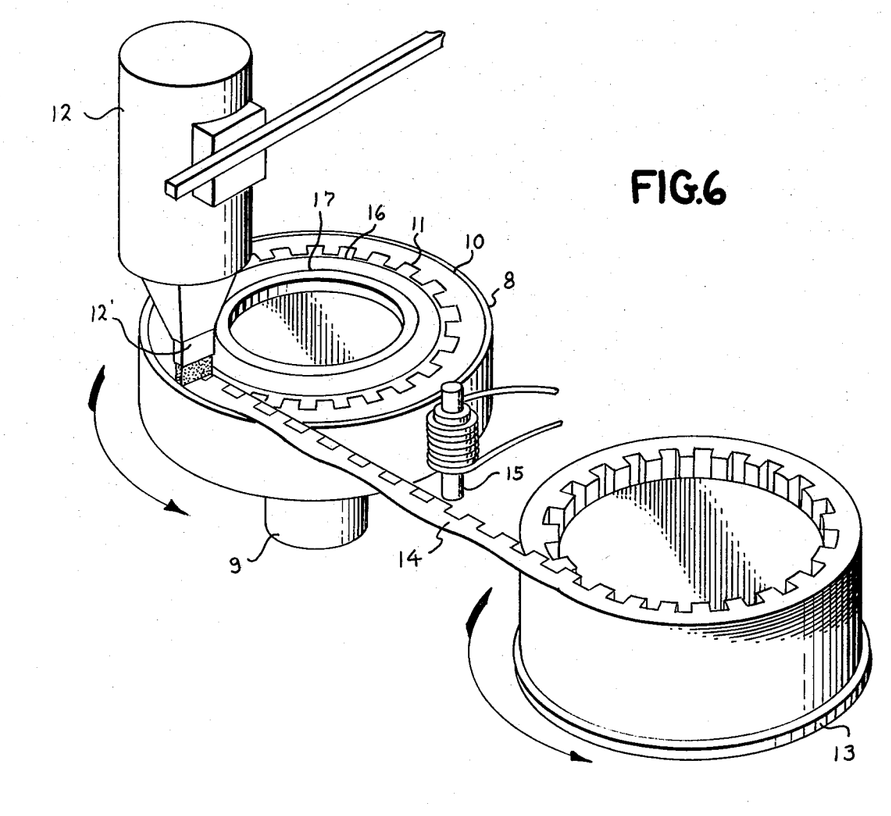
FIG. 6 is a perspective view of diagrammatically illustrated machinery suitable for manufacturing slotted amorphous metal ribbon of a type that can be used in practicing the subject invention.

Now that several embodiments of a stator assembly constructed pursuant to the invention have been described, reference will be made to FIGS. 6, 7 and 8 to describe preferred methods for manufacturing such a stator assembly. In FIG. 6 there is shown a rotatably mounted disc 8 supported on a shaft 9 that is selectively rotated by appropriate drive means (not shown). The disc 8 is maintained at a suitably low temperature to chill the molten metal alloy applied to it at a sufficiently rapid rate, i.e., in the range of 1 million degrees Centigrade per second. A selected pattern of insulated and uninsulated portions is formed on the upper surface of the disc to define a slotted ribbon of solidified metal. Specifically the upper area of the disc, as indicated between the circular line 10 and the irregular line 11, is uninsulated so that it will be maintained at a very low temperature. On the other hand, the portions of the upper surface of the disc 8 outward from the area between these two lines is insulated so that when molten metal contacts them it will form a crystalline structure since it will not be cooled as rapidly as the metal contacting the area between the lines. A suitable reservoir 12 is provided for maintaining a selected amorphous metal alloy in a molten condition while it is being discharged through a shaped port 12' onto the upper surface of the disc 8 in a pattern that is substantially the width of the maximum portion of the pattern defined between the two lines 10 and 11. A second rotatable disc 13 is positioned to one side of the disc 8 for storing the ribbon 14 as it is solidified and thrown off of the disc 8 by the rapid rotation thereof. An ultrasonic vibrating head 15 is mounted on suitable means (not shown) between the two discs and directly over the ribbon 14 in order to vibrate the ribbon and cause the more slowly cooled, crystalline metal portion defined by the insulated surface on the disc 8 to drop out of the amorphous metal ribbon 14 leaving the desirably slotted configuration shown, which then accumulates on the suitably rotated spool 13.

It will be recognized that the diameter of the helical ribbon 14 in its unsupported condition, as shown generally on the spool 13, will be approximately the diameter of the casting form selected on the upper surface of the disc 8. Thus, a helical ribbon having one selected diameter in its unsupported condition will be formed if the molten metal is cast in the pattern defined by the lines 10 and 11, whereas, a helical ribbon having a second, smaller diameter in its unsupported condition will be formed if the molten metal is cast between the pattern of insulated portions of disc 8 defined by the lines 16 and 17 on the upper surface of the chilled disc. Of course, if it is desired to manufacture a helical ribbon that does not have winding-receiving slots in it, a chilled disc (similar to disc 8) will be used that has a ribbon-defining uninsulated portion thereon bordered by two concentric substantially circular lines, such as illustrated lines 16 and 17.

Figure 7:
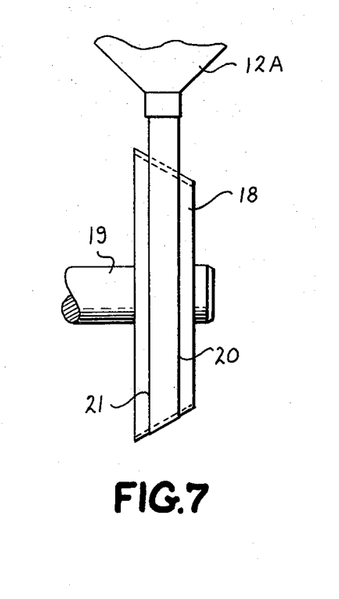
FIG. 7 is a side elevation of part of another form of manufacturing machine for making amorphous metal ribbon that can be readily edgewound to form a cylinder having individual turns that are conical in configuration, pursuant to one aspect of the invention.

In the event that it is desired to form a helical ribbon that is cast with a dished or frusto-conical configuration in its unsupported condition, a chilled disc such as the disc 18, shown in FIG. 7, mounted on a suitable rotatable shaft 19, that is driven by appropriate drive means (not shown) can be used in conjunction with a molten metal distributing container 12A, for depositing a stream of molten metal between the lines of insulating material 20 and 21 onto an uninsulated strip of the disc 18 between these lines (20 and 21) to cast such a ribbon in the desired conical form. A further description of such a suitable casting apparatus for practicing the invention may be found, if desired, by referring to above-identified U.S. patent application Ser. No. 903,140. Of course, other manufacturing apparatus may be used to practice the unique method steps of the invention which will now be described with reference to FIG. 8 of the drawing.

It should be recognized that if a suitably wide amorphous metal strip is formed, for example by the techniques described above with reference to FIG. 6 or 7, a stator may be formed by helically winding a single strip. Preferably, such a strip would be 2 to 4 inches in width. According to the invention, the slots in such a strip would be accurately aligned by dishing the turns of the strip as they are wound, so that the turns assume a conical form, then the turns are bonded together with a suitable bonding resin, as described above. Turns that are cast flat will usually take a conical form since the cast diameter may not be consistant with the slot spacing and required number of slots.

Figure 8:
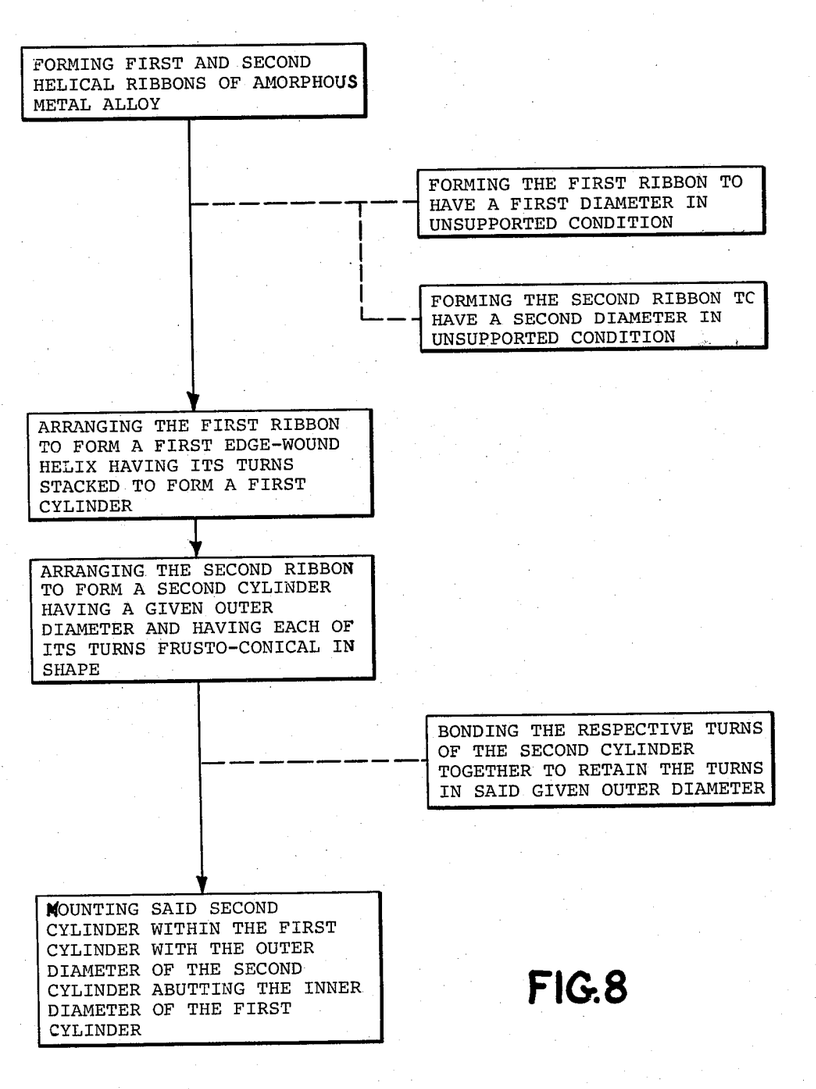
FIG. 8 is a flow chart showing the primary steps of a preferred method for manufacturing a stator according to the present invention, in combination with a number of alternative steps useful in practicing modifications of the basic method of the invention.

As shown by the flow chart in FIG. 8 the first basic step of the method is to form first and second helical ribbons of high magnetic induction amorphous metal alloy. Next, a selected length of the first ribbon is arranged to form a first edgewound helix having its adjacent turns stacked on one another to form a first cylinder, then a selected length of the second ribbon is formed as a second edgewound helix having each of its turns disposed in conical relation to the longitudinal axis of the second helix and stacked on one another in a predetermined diameter. Finally, the second cylinder is mounted within the first cylinder with the precisely determined diameter of the second cylinder in abutment with the inner edges of the turns of the first cylinder, respectively, thereby to form a low magnetic reluctance junction between the two cylinders in the composite stator assembly.

Alternative sequential steps of the basic method of the invention just described are shown in the flow chart of FIG. 8 by dashed lines. Thus, a second step indicated by the first horizontal dashed line is performed, in a modification of the basic method, by forming the first ribbon to have a first preselected diameter in its unsupported condition. Next, the second ribbon is formed to have a second, different pre-selected diameter in its unsupported condition. Then, the next two primary steps shown in the flow chart to the left side of FIG. 8 are performed and a third alternative step, indicated by the second horizontal dashed line, is performed by bonding the respective turns of the second cylinder to one another to rigidify the second cylinder in its given precisely determined diameter attained by dishing the respective turns thereof as explained above, before the second cylinder is positioned within the first cylinder pursuant to the last primary step of the method of the invention.

Yet another alternative arrangement of the method steps of the invention would be used if a single wide strip of slotted amorphous metal is used to form a stator. In such a process, the method steps shown in FIG. 8 would be generally followed, except that only a first helical ribbon would be formed and edgewound to define a cylinder. In such a case, the turns of the first cylinder would be dished as needed to accurately align the winding slots in the ribbon, then the turns would be bonded together to fix them in their relative positions.

As mentioned briefly by way of background above, a variety of amorphous metals are known to have desirably high magnetic induction properties to recommend their use in making electric motor stators. It has been found that the amorphous metal portions of the stator (1) described above can be made of the alloy $Fe_{80}B_{20}$ and preferably that alloy, or an amorphous metal consisting essentially of a composition selected from the group consisting of: $Fe_{83}B_{17}$, $Fe_{78}B_{22}$, $Fe_{77}B_{23}$, $Fe_{76}B_{24}$, $Fe_{75}B_{25}$, $Co_{80}B_{20}$, $Fe_{83}B_{17}Si_3$ or $Fe_{40}Ni_{40}P_{14}B_6$ is used to form the ribbons (4 and 5) of high magnetic induction amorphous metal, described above.

It will be apparent from the description of the invention given above that further modifications and alternative forms may be developed without departing from the spirit of the invention. Thus, it is intended that the true scope of the invention be limited only by the following claims.

What I claim as new and desire to secure by Letters Patent of the United States is:

1. A dynamoelectric machine stator comprising a first edgewound helix of amorphous metal ribbon arranged with its adjacent turns stacked on one another to form a first cylinder, a second edgewound helix of amorphous metal ribbon arranged with its adjacent turns stacked on one another to form a second cylinder, each of the turns of said second helix being frusto-conical in configuration, said second cylinder being mounted concentrically with the first cylinder.

2. A stator as defined in claim 1 wherein the second cylinder is mounted within the first cylinder and the inner edges of the turns in the first helix are disposed in abutting relationship, respectively, with adjacent outer edges of the turns in the second helix.

3. A stator as defined in claim 2 wherein the turns of said second helix are supported in radial compression by the first cylinder.

4. A stator as defined in claim 2 wherein the turns of said second helix are in the range of about 1 to 3 mils thick, and including a coating of bonding and insulating resin of substantially uniform thickness disposed over the wide surfaces of at least one side of substantially all of the turns of both helixes.

5. A stator as defined in claim 3 including a plurality of spaced axial slots in the inner surface of said second cylinder for receiving therein the turns of a stator winding.

6. A stator as defined in claim 3 including a plurality of spaced axial slots in the outer surface of said second cylinder for receiving therein the turns of a stator winding.

7. A stator as defined in claim 2 wherein said first and second helixes are formed of ribbons of high magnetic induction amorphous metal consisting essentially of a composition selected from the group consisting of: $Fe_{80}B_{20}$, $Fe_{83}B_{17}$, $Fe_{78}B_{22}$, $Fe_{77}B_{23}$, $Fe_{76}B_{24}$, $Fe_{75}B_{25}$, $Co_{80}B_{20}$, $Fe_{83}B_{17}Si_3$ or $Fe_{40}Ni_{40}P_{14}B_6$.

8. A stator as defined in claim 5 wherein the respective wide surfaces of the turns of said first and second helixes are each substantially flat.

9. A stator as defined in claim 1 wherein one of said cylinders is formed of high induction amorphous metal and the other cylinder is formed of a high induction crystalline metal.

10. A dynamoelectric machine stator comprising a first strip of amorphous metal alloy spirally wound to define a first cylinder, and a second helical strip of edgewound amorphous metal alloy arranged to define a second cylinder having each helical turn thereof centered in frusto-conical relationship around the longitudinal axis of said second cylinder, said second cylinder being mounted within the first cylinder, and means defining a plurality of spaced, axially extending slots formed in either the inner or outer surface of said second cylinder for receiving therein an electrically conductive stator winding.

11. A dynamoelectric machine stator comprising a strip of amorphous metal alloy having a plurality of slots formed in one edge thereof, said strip being spirally wound to define a cylinder in which said slots in each turn of the cylinder are in accurate alignment with the slots in adjacent turns and the turns are each dished to a frusto-conical configuration to afford said slot alignment, in combination with bonding means for securing the turns of the stator in fixed relation to one another.

* * * * *